United States Patent
Schellhase et al.

(10) Patent No.: US 6,688,767 B2
(45) Date of Patent: Feb. 10, 2004

(54) SELF-ALIGNING DYNAMIC HINGE SLEEVE

(75) Inventors: Edward G. Schellhase, Broomall, PA (US); Frank A. Smith, Jr., Woodlyn, PA (US); Steven J. Spear, Aston, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/015,098

(22) Filed: Dec. 11, 2001

(65) Prior Publication Data

US 2003/0108258 A1 Jun. 12, 2003

(51) Int. Cl.[7] ............................................. F16C 27/06
(52) U.S. Cl. ................................................. 384/222
(58) Field of Search ........................... 384/199, 200, 384/201, 230, 231, 235, 215, 220, 221, 222, 300, 280, 296; 416/134 A, 134 R

(56) References Cited

U.S. PATENT DOCUMENTS

| | | | | |
|---|---|---|---|---|
| 3,292,711 A | * | 12/1966 | Peterson et al. | 416/147 |
| 3,781,073 A | * | 12/1973 | Jorn et al. | 384/220 |
| 4,297,078 A | * | 10/1981 | Martin | 416/134 A |
| 4,349,184 A | * | 9/1982 | Peterson et al. | 384/125 |
| 5,120,195 A | * | 6/1992 | Schmaling et al. | 416/134 A |
| 5,261,748 A | * | 11/1993 | Kameda | 384/222 |
| 5,263,778 A | * | 11/1993 | Jordens et al. | 384/140 |
| 5,330,322 A | * | 7/1994 | Aubry | 416/134 A |
| 5,593,233 A | * | 1/1997 | Kammel et al. | 384/222 |
| 6,481,894 B1 | * | 11/2002 | James | 384/202 |

* cited by examiner

Primary Examiner—Thomas R. Hannon

(57) ABSTRACT

A self-aligning dynamic hinge sleeve for attachment to a pitch hinge in a position that places the hinge sleeve in contact with a pitch bearing. The hinge sleeve is comprised of an inner race, a middle race and an outer race, wherein the middle race is an elastomeric material, or another soft material, that bonds the inner and outer races together and allows the inner race and outer race to rotate with respect to each other. As the pitch hinge transmits forces and moment to a pitch shaft, the dynamic hinge sleeve aligns with a pitch bearing secured onto the pitch shaft. This results in a self-aligning pitch bearing rotor that significantly reduces the level of peak that loads upon a bearing and thereby permits the use of self-lubricating bearings in a rotor.

15 Claims, 5 Drawing Sheets

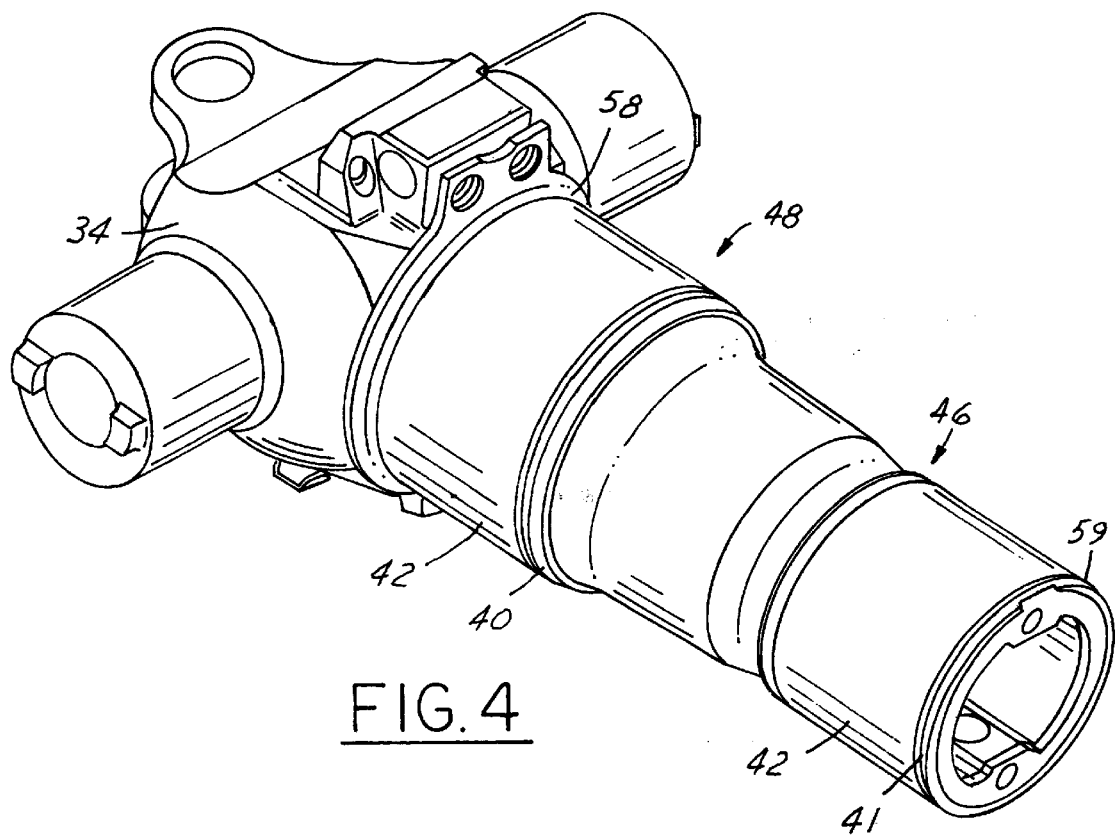
FIG. 4
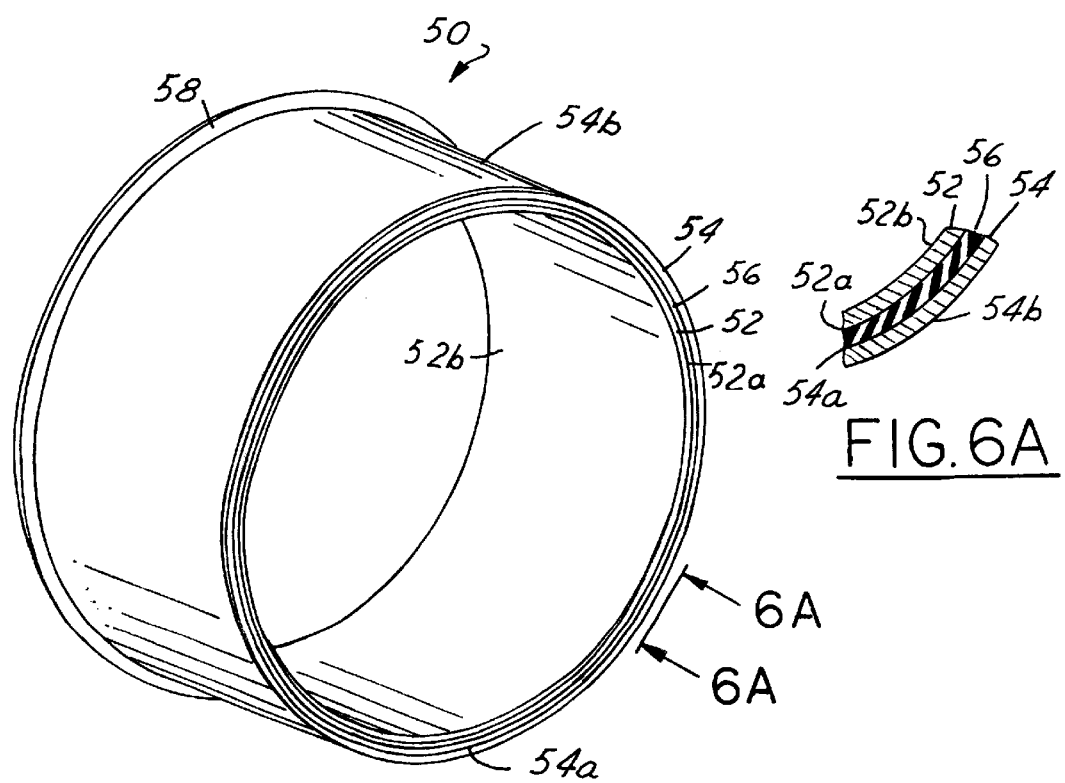
FIG. 6
FIG. 6A

SELF-ALIGNING DYNAMIC HINGE SLEEVE

STATEMENT REGARDING FEDERALLY SPONSORED RESEARCH

This invention was made with Government support under Contract No. DAAH01-99-3-R001. The Government has certain rights in this invention.

TECHNICAL FIELD

The present invention relates generally to dynamic hinge sleeves and more particularly to a self-aligning dynamic hinge sleeve for self-lubricated hinge bearings.

BACKGROUND OF THE INVENTION

Oil bearings and solid steel hinge sleeves are components of some typical rotors, including helicopter blade rotors. One drawback of this type of rotor is the cost of frequent scheduled and unscheduled maintenance and/or repairs. Moreover, a large percentage of rotorcraft ground time and maintenance expense is due specifically to difficulties with oil bearings, including oil leakage and bearing replacement. Thus, there exists a need for a rotor that requires less maintenance and thereby decreases costs.

One proposed solution to this problem is to replace the oil bearings with self-lubricated dynamic hinge bearings. The self-lubricated bearings are processed with long lasting, dry lubricant. These self-lubricated bearings require less unscheduled maintenance than oil bearings, which results in a lower life-cycle cost. Moreover, the self-lubricated dynamic hinge bearings can significantly reduce maintenance costs and provide a low maintenance rotor.

However, self-lubricated dynamic hinge bearings are not compatible with existing rotorcraft technology, which utilizes a solid steel hinge sleeve attached to the rotor hinge. Moreover, extensive stress testing and analysis has demonstrated that when the solid steel hinge sleeve is attached to the self-lubricating bearing dynamic hinge, the self-lubricated bearing does not typically align. As a result of this bearing misalignment, the contact stresses on the hinge bearings can peak to unacceptably high levels. This excessive load peaking can significantly reduce the life span of the self-lubricated bearing. Therefore it is necessary to reduce or eliminate load peaking if these types of bearings are to be utilized.

SUMMARY OF THE INVENTION

It is an object of the present invention to provide an improved hinge sleeve member.

It is also an object of the present invention to provide a hinge sleeve that reduces the unacceptable levels of load peaking on associated bearings.

It is another object of the present invention to provide a low maintenance rotor using self-lubricated dynamic hinge bearings thereby reducing the overall costs and maintenance of the rotor.

In accordance with the above and other objects of the present invention, a hinge sleeve for use within a rotor is disclosed. The hinge sleeve includes three cylindrical races functioning as a single unit. The inner race is surrounded by the outer race, and both the inner race and the outer race are formed of a non-elastomeric material. The middle race is positioned between the inner race and outer race and binds the races together. The middle race is elastomeric and allows the inner race and the outer race to rotate relative to each other and accommodates for misalignments during use. This mechanism attenuates the load peaking which is transmitted to the bearing material.

BRIEF DESCRIPTION OF THE DRAWINGS

Further objects and advantages of the invention will be apparent from the following description and appended claims, reference being made to the accompanying drawings forming a part of the specification, wherein like reference characters designate corresponding parts in the several views:

FIG. 4 is a perspective view of a pair of bearings attached to a pitch shaft in accordance with a preferred embodiment of the present invention.

FIG. 6 is a perspective view of a dynamic hinge sleeve in accordance with a preferred embodiment of the present invention.

FIG. 6A is a cross-sectional view of a preferred embodiment of the present invention.

DETAILED DESCRIPTION OF THE PREFERRED EMBODIMENT

The present invention relates to a self-aligning dynamic hinge sleeve member for use with rotorcraft technology. The dynamic hinge sleeve member is preferably utilized in connection with helicopter rotors, but it will be understood that it can have a variety of other uses and applications. Therefore, the present invention is not limited to use only in rotorcraft or helicopters.

Figure 1:
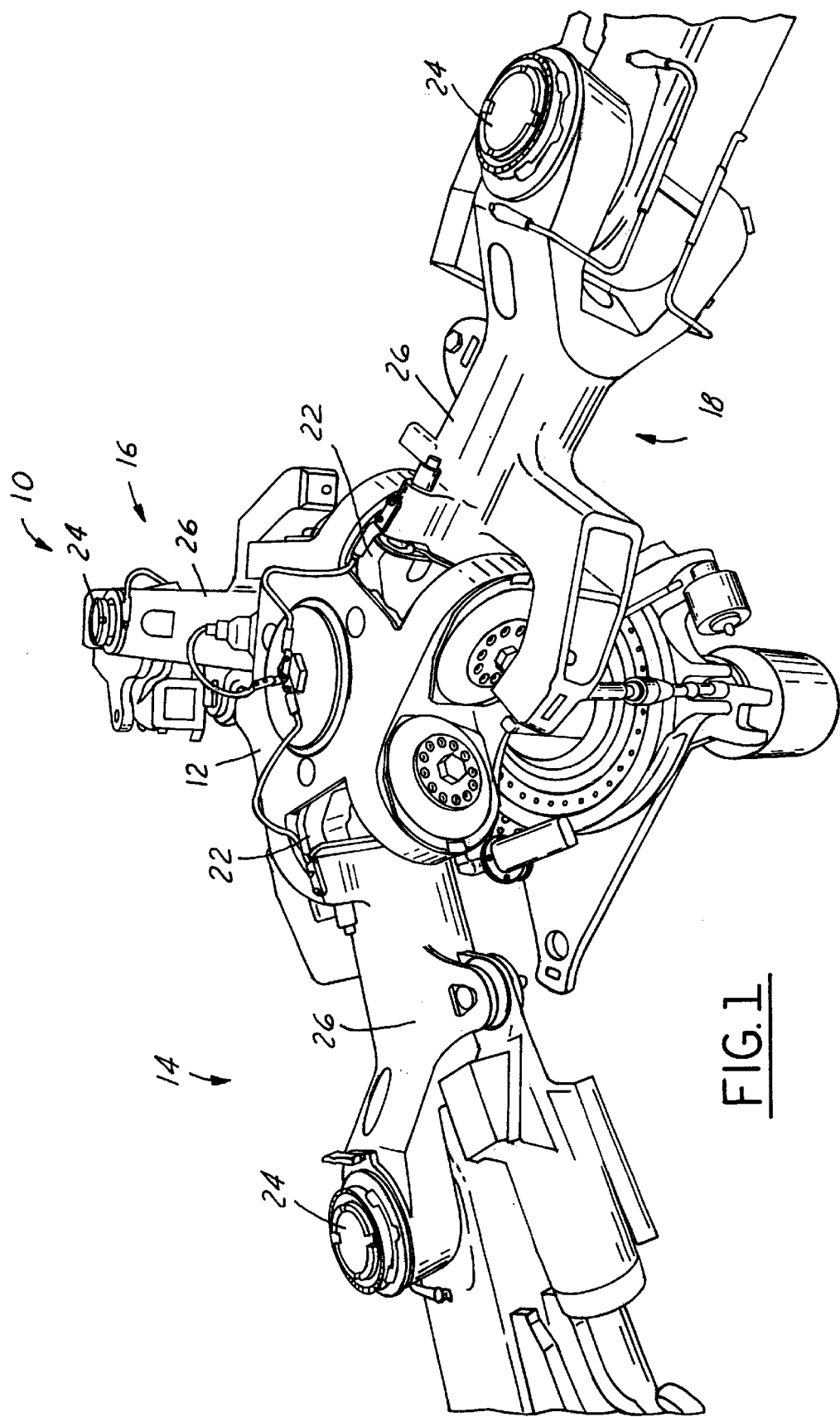
FIG. 1 is a perspective view of a rotor assembly in accordance with a preferred embodiment of the present invention.

Turning first to FIG. 1, there is shown a rotor assembly 10 to which the present invention may be applied. As illustrated in FIG. 1, a typical rotor, such as a helicopter blade rotor, comprises an assembly constructed of a main hub member 12 and a plurality of rotor members 14, 16, and 18. Several hinge assemblies connect the rotor members 14, 16, and 18 in a conventional manner to the main hub member 12. As FIG. 1 depicts, the hinge assemblies include a horizontal hinge 22, a vertical hinge 24, and a pitch hinge 26. In this embodiment of a rotor assembly, the present invention is directed to the pitch hinge 26.

Figure 2:
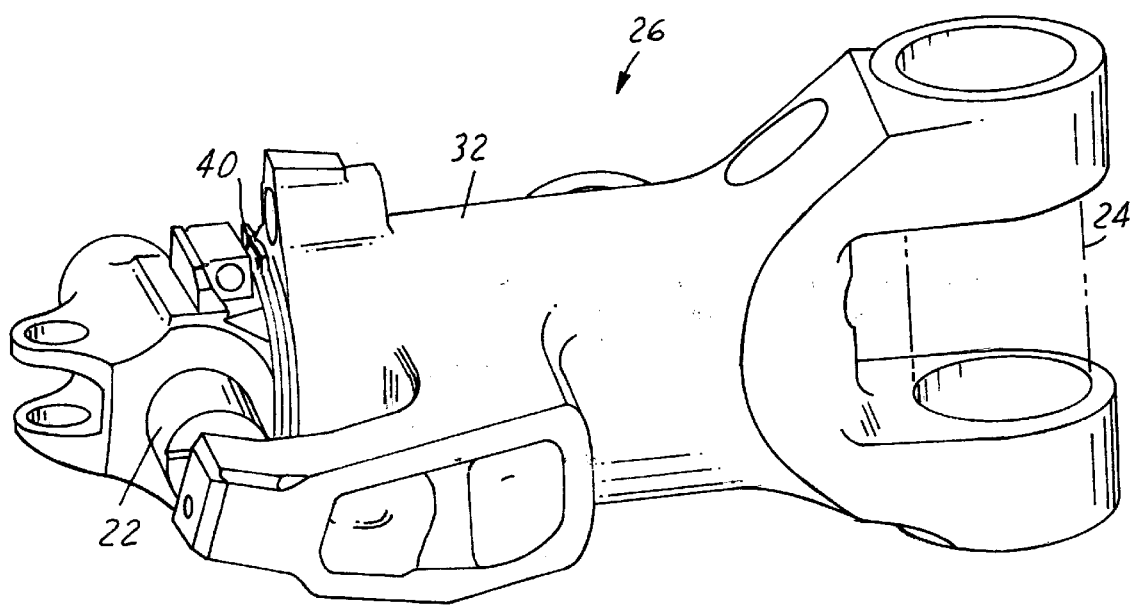
FIG. 2 is a schematic illustration of the pitch hinge assembly in accordance with a preferred embodiment of the present invention.
Figure 3A:
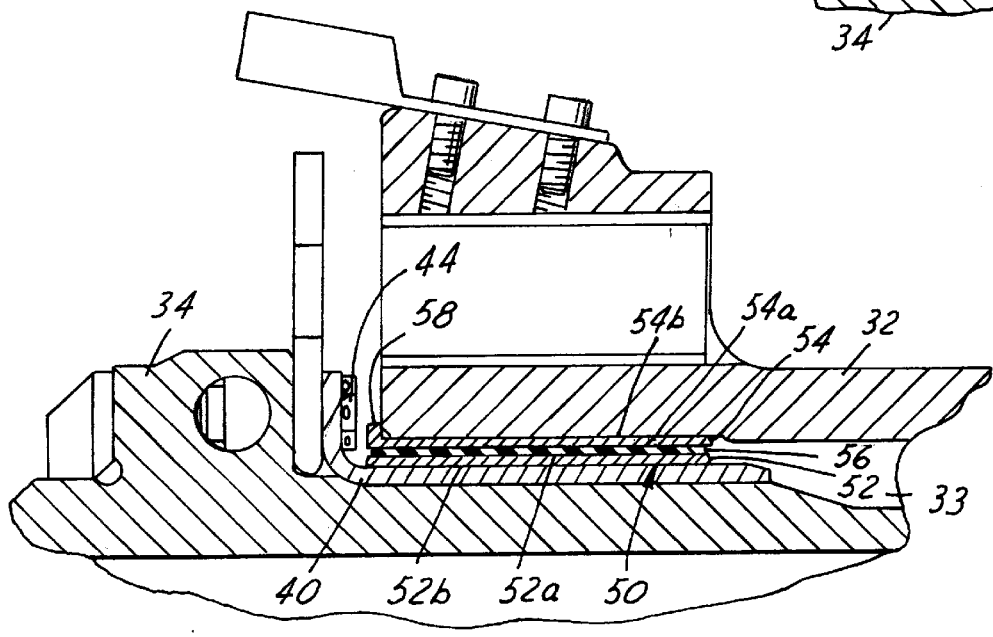
FIG. 3A is a close up view of the present invention as applied to the pitch hinge assembly in FIG. 2.
Figure 3:
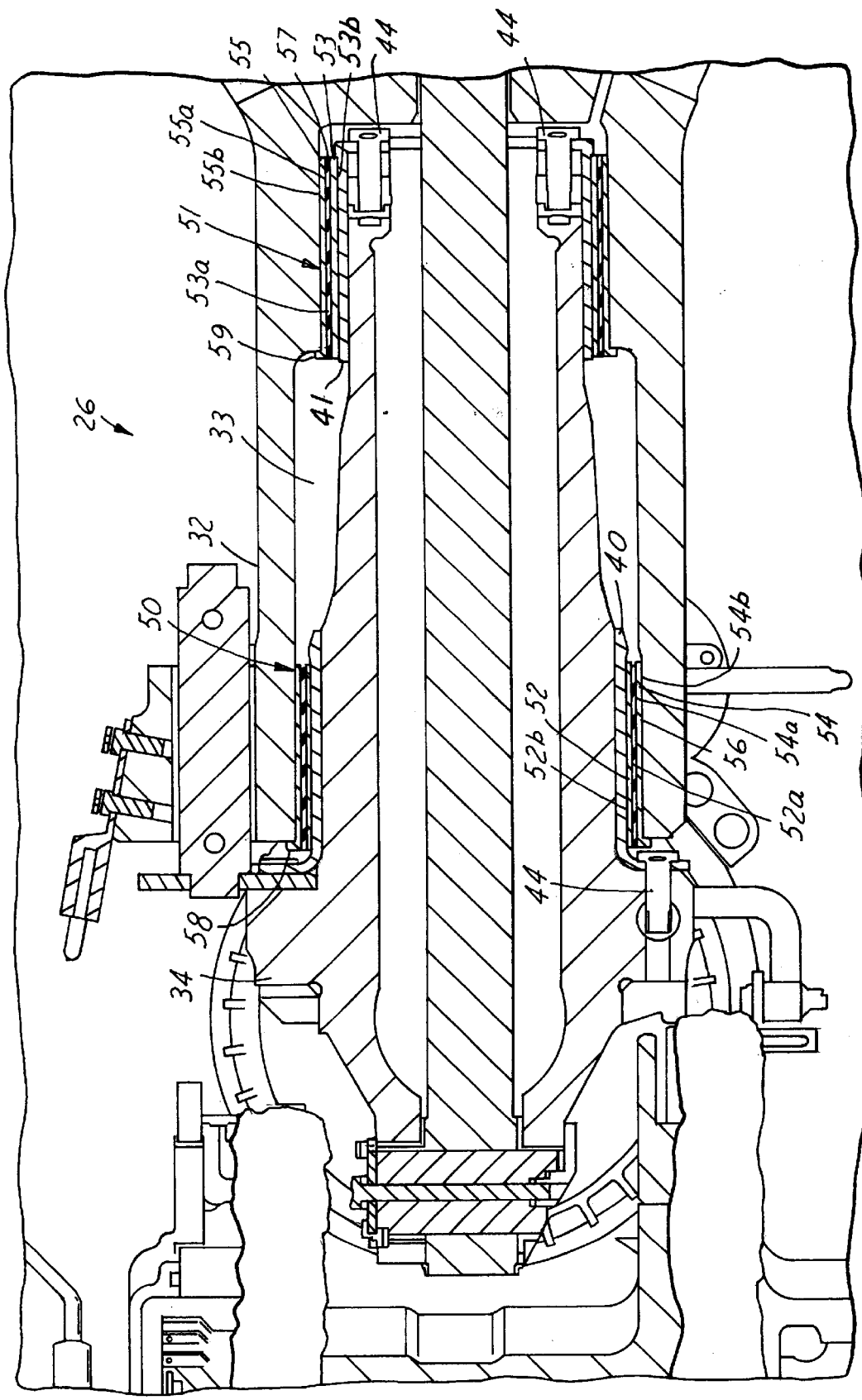
FIG. 3 is a cross-sectional view of the pitch hinge assembly in FIG. 2.

As shown, in FIGS. 2, 3, and 3A, the pitch hinge 26 includes a pitch housing member 32 which encases a pitch shaft member 34. Attached to the pitch shaft member 34 is at least one pitch hinge bearing 40. As further illustrated in FIG. 3, a cross-sectional view, the pitch hinge 26 is an assembly that includes the pitch housing member 32, the pitch hinge bearing 40 and the pitch shaft member 34, all of which are contiguous with respect to each other. More than one pitch hinge bearing 40, 41 may be attached to the pitch shaft member 34. The pitch hinge 26 transmits forces and moments from the pitch housing member 32 to the pitch shaft member 34 while allowing the pitch housing member 32 to rotate with respect to the pitch shaft member 34. This results in highly concentrated contact stresses being placed upon the pitch hinge bearing 40, 41.

As further shown, in FIG. 3, more than one self-aligning dynamic hinge sleeve member 50, 51, may be attached to the pitch hinge 26 within the rotor. In this position, the self-aligning dynamic hinge sleeve member 50, 51 is in contact with the pitch hinge bearing 40, 41 which allows the pitch housing member 32 to self-align with the pitch hinge bearing 40, 41. This provides a self-aligning pitch bearing rotor assembly and, as a result, the load peaking (contact stress concentrations) upon the pitch hinge bearing 40, 41 can be reduced to an acceptable level.

Figure 7:
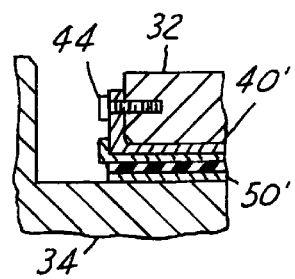
FIG. 7 is a close-up view of an alternative embodiment of the present invention as applied to the pitch hinge assembly of FIG. 2.

In an alternative embodiment, as shown in FIG. 7, the relative location of the pitch hinge bearing 40, and the self-aligning dynamic hinge sleeve member 50 can be reversed. Whereas FIGS. 3 and 3A illustrate the self-aligning dynamic hinge sleeve member 50 positioned between the pitch housing member 32 and the pitch hinge bearing 40, FIG. 7 depicts the self-aligning dynamic hinge sleeve member 50' positioned between the pitch shaft member 34 and the pitch hinge bearing 40'. In this embodiment, the pitch housing member 32, the pitch hinge bearing 40', self-aligning dynamic hinge sleeve member 50', and pitch shaft member 34 are contiguous with respect to each other.

In accordance with the present invention, and illustrated further in FIG. 3A, the self-aligning dynamic hinge sleeve member 50, is comprised of an inner race member 52, an outer race member 54 surrounding the inner race member 52, and a middle race member 56. The middle race member 56 is comprised of an elastomeric or other soft material that allows relative movement between the inner race member 52 and the outer race member 54. The inner race member 52 has an interior surface 52a and an exterior surface 52b. The outer race member 54 also has an interior surface 54a and an exterior surface 54b. A flange 58 on the exterior surface 54b of the outer race member 54 secures the outer race member 54 to the pitch housing member 32. The inner race member 52 is in contact with the pitch hinge bearing 40.

Although FIG. 3A shows the self-aligning dynamic hinge sleeve member 50 being attached to the pitch housing member 32 and the self-aligning dynamic hinge sleeve member 50 being attached by a flange 58, other attachment locations and configurations may be utilized in accordance with the present invention.

As FIG. 4 illustrates, more than one pitch hinge bearing 40, 41 may be attached to the pitch shaft member 34. The pitch hinge bearings 40, 41 are attached to the pitch shaft member 34 such as by bolts 44, as shown in FIGS. 3 and 3A. The embodiment that is depicted in FIG. 4 shows the pitch hinge bearing 41 attached to an end portion 46 of the pitch shaft member 34 and the pitch hinge bearing 40 attached to a central portion 48 of the pitch shaft member 34. The pitch hinge bearings 40, 41 do not rotate on the pitch shaft member 34. In a preferred embodiment, the pitch hinge bearings 40, 41 have a self-lubricating material 42 bonded to the bearing surface. Self-aligning dynamic hinge sleeve members 50, 51 are positioned in contact with pitch hinge bearings 40 and 41, respectively.

Figure 5:
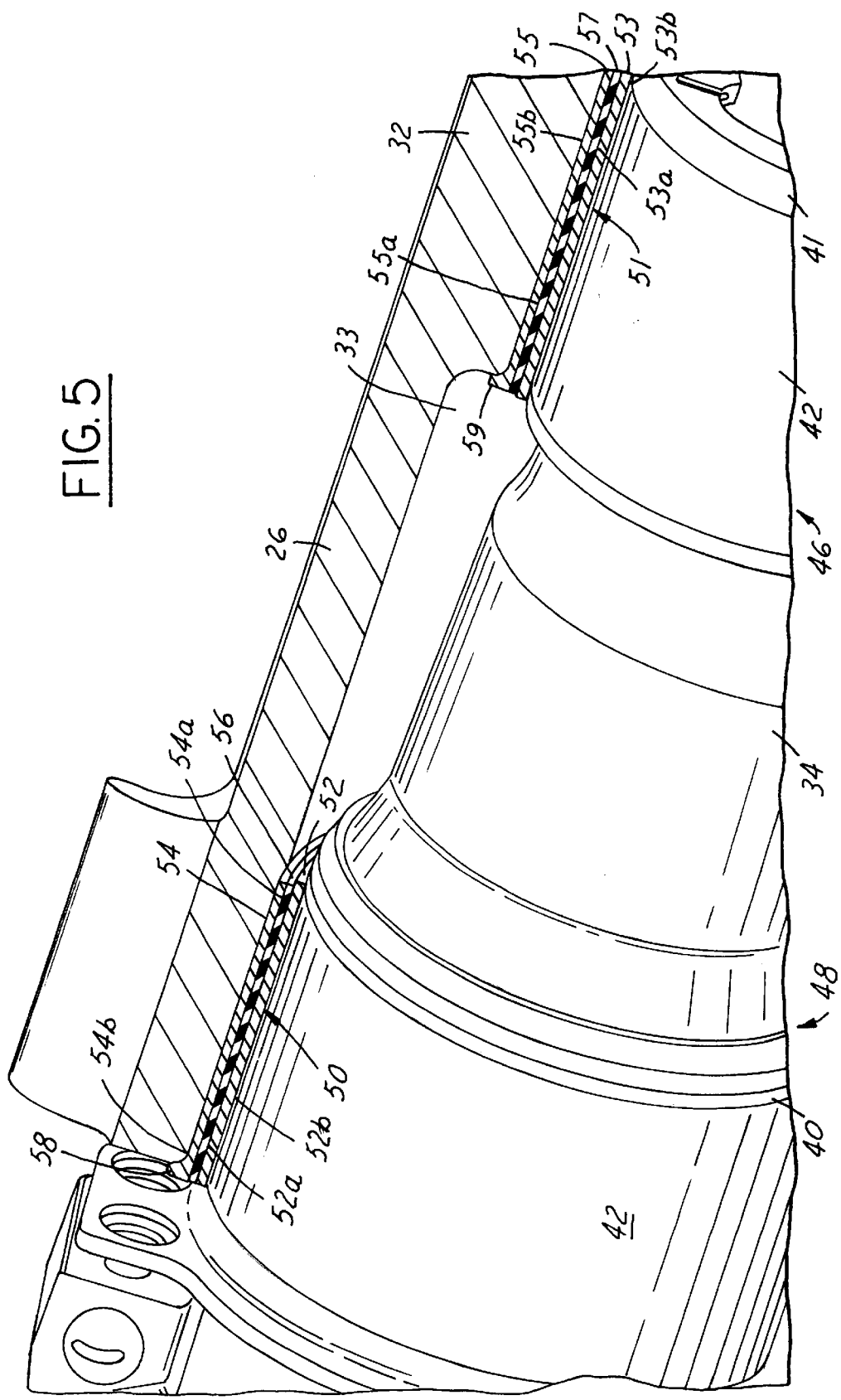
FIG. 5 is an enlarged cut away view of the pitch hinge components of FIG. 2.

As illustrated in FIG. 5, the pitch hinge bearings 40, 41 are attached to the pitch shaft member 34, and in contact with exterior surfaces 52b and 53b of the inner race members 52 and 53 respectively, of the present invention. The outer race members 54, 55 are affixed to the pitch hinge member 26 at exterior surfaces 54b and 55b of the outer race members 54 and 55, respectively. A flange 58 on the exterior surface 54b, and a flange 59 on the exterior surface of 55b may be utilized as attachment devices. Thus, in a preferred embodiment, as viewed in FIG. 5, an assembled pitch hinge 26 functions when the pitch housing member 32 and self-aligning dynamic hinge sleeve members 50, 51 rotate on pitch hinge bearings 40, 41 which are attached to the pitch shaft member 34. As forces and moments are transmitted, from the pitch housing member 32 to the pitch shaft member 34, the pitch housing member 32 and pitch shaft member 34 each deflect. The inner race members 52, 53 of the self-alignment sleeve members 50, 51 are allowed to align themselves to the pitch hinge bearings 40, 41 due to the elastomeric middle race members 56, 57. This alignment of the inner race members 52, 53 and the pitch hinge bearings 40, 41 reduces the peak level of contact stresses upon the pitch hinge bearings 40, 41, creating a more uniform contact stress distribution.

In a preferred construction, as illustrated in FIGS. 6 and 6A, the self-aligning dynamic hinge sleeve member 50 is comprised of an inner race member 52, a middle race member 56 and an outer race member 54. The inner race member 52 has an interior surface 52a and an exterior surface 52b. The outer race member 54 also has an interior surface 54a and an exterior surface 54b, and a flange 58. The flange 58 is a portion of the exterior surface 54b of the outer race member 54. In a preferred embodiment, the flange 58 of the outer race member 54 secures the dynamic hinge sleeve member 50 to the pitch hinge 26. The inner race member 52 and the outer race member 54 are bonded together at the interior surfaces 52a, 54a by the middle race member 56. The middle race member 56 is comprised of an elastomeric material. In accordance with one aspect of the present invention, the inner race member 52 and outer race member 54 are comprised of a non-elastomeric material. In a preferred embodiment, the inner race member 52 and the outer race member 54 are monolithic metallic structures, but other materials, such as fiber laminated composites, may be employed.

In a preferred embodiment, the middle race member 56 of the present invention is comprised of an elastomeric material, either natural rubber, synthetic rubber or a combination. It is conceivable that non-elastomeric materials could also be employed, provided that the middle race member 56 is softer and more compliant than the inner race member 52 and outer race member 54. The precise selection of materials is within the knowledge of those of ordinary skill in the art.

When a self-aligning dynamic hinge sleeve member 50 is attached to the pitch hinge 26 of the rotor assembly, self-lubricating pitch hinge bearings may be used in place of oil bearings. Accordingly, by replacing the oil bearings with self-lubricating bearings, the rotor system requires less maintenance and repair, providing a low maintenance rotor and substantially reducing costs.

The present invention also provides a method for minimizing the load peaking on a rotor dynamic hinge bearing. The inventive method comprises positioning a pitch hinge bearing 40 on the pitch shaft member 34, and further positioning a self-aligning dynamic hinge sleeve member 50 on the pitch hinge bearing 40. The self-aligning dynamic hinge sleeve member 50 is comprised of an inner race member 52 and an outer race member 54, and placing the inner race member 52 within the outer race member 54. Once the inner race member 52 and outer race member 54 are in this stated position, the next step is positioning a middle race member 56 comprised of elastomeric material between the inner race member 52 and outer race member 54. The elastomeric material is adapted to permit the inner race member 52 and outer race member 54 to have limited rotation and cocking with respect to each other. Subsequently, the pitch shaft member 34 is positioned within the pitch housing cavity 33 inside pitch housing member 32. In this position the elastomeric middle race member 56 of the self-aligning dynamic hinge sleeve 50 permits the pitch housing member 32 and the pitch shaft member 34 to self-align, and in doing so attenuates the stresses on the pitch hinge bearing 40.

Rotor systems that use oil bearings experience an array of costly and time consuming maintenance problems. A plausible solution that would lower costs and reduce maintenance is to replace the oil bearings with self-lubricating bearings. However, under the current rotor technology, the self-lubricating bearings are stripped of the dry protective lubricant material and therefore unable to function effectively.

In an embodiment of the present invention, the self-aligning dynamic hinge sleeve utilizes a layer of elastomeric material trapped between two non-elastomeric race members. The selection of both the geometry and stiffness of the elastomeric material allows limited rotation and cocking with respect to each other, and permits the pitch housing member 32 to self-align with the pitch hinge bearings 40.

As a result, the contact stress peaking transmitted from the self-lubricated dynamic pitch hinge to the self-lubricated bearing can be significantly reduced when the self-aligning dynamic hinge sleeve is used in place of the solid steel hinge sleeve. This improvement brings stresses that far exceeded the self-lubricated bearing materials allowable, down to a level that is acceptable. This in turn substantially increases the bearing life.

The present invention is a novel method and apparatus that permits self-lubricating bearings to function in a rotor system and thereby provide a highly effective rotor system that requires less maintenance and reduces overall costs.

While the invention has been described in terms of preferred embodiments, it will be understood, of course, that the invention is not limited thereto since modifications may be made by those skilled in the art, particularly in light of the foregoing teachings.

What is claimed is:

1. A self-aligning pitch bearing rotor assembly comprising:
   a pitch housing member having a hollow cavity therein;
   a pitch shaft member positioned in said hollow cavity in said pitch housing member, said pitch shaft member having an end portion and a central portion;
   a first pitch hinge bearing positioned on said pitch shaft member; and
   a first pitch hinge sleeve member positioned between said first pitch hinge bearing and said pitch housing member, said first sleeve member comprised of an inner race member, an outer race member, and a middle race member positioned between said inner and outer race members, said middle race member being made of a material which is softer than the material which comprises said inner and outer race members.

2. The self-aligning pitch bearing rotor assembly of claim 1 wherein said pitch hinge bearing is secured to said pitch shaft member.

3. The self-aligning pitch bearing rotor assembly of claim 2 wherein said pitch hinge bearing is secured to said pitch shaft member with bolt members.

4. The self-aligning pitch bearing rotor assembly of claim 1 wherein said inner and outer race members are each comprised of a metallic material and said middle race member is comprised of an elastomeric material.

5. The self-aligning pitch bearing rotor assembly of claim 1 wherein said inner and outer race members are each comprised of a monolithic metallic structure.

6. The self-aligning pitch bearing rotor assembly of claim 1 wherein said pitch hinge bearing is self-lubricating.

7. The self-aligning pitch rotor assembly of claim 1 further comprising a second pitch hinge bearing, said first pitch hinge bearing positioned on the end portion of the pitch shaft member and said second pitch hinge bearing positioned on the central portion of the pitch shaft member.

8. The self-aligning pitch bearing rotor assembly of claim 7 further comprising a second hinge sleeve member, said second hinge sleeve member comprising an inner race member, an outer race member and a middle race member, said middle race member being comprised of a material which is relatively softer than the material comprising said inner and outer race members, said second hinge sleeve member positioned between said second pitch hinge bearing and said pitch housing member.

9. The self-aligning pitch bearing rotor assembly of claim 7 wherein said pitch hinge bearings are self-lubricating.

10. A method for minimizing contact stress peaking in a rotor dynamic hinge bearing comprising:
    positioning a first pitch hinge bearing on a pitch shaft member, said pitch shaft member having an end portion and a central portion;
    positioning a first hinge sleeve member on said first pitch hinge bearing, said first pitch sleeve member comprised of an inner race member, an outer race member and a middle race member, said middle race member being comprised of a material which is relatively softer than the material comprising said inner and outer race members; and
    positioning said pitch shaft member inside a pitch housing member, said pitch housing member having a cavity wherein said middle race member accommodates for misalignment of said pitch shaft member and said pitch housing member.

11. The method of claim 10 wherein said first pitch hinge bearing is secured to said pitch shaft member.

12. The method of claim 10 wherein said first pitch hinge bearing is self-lubricating.

13. The method of claim 10 wherein a second pitch hinge bearing is secured to said pitch shaft member, said first pitch hinge bearing is secured to said end portion of the pitch shaft member, and said second pitch bearing is secured to said central portion of said pitch shaft member.

14. The method of claim 13 further comprising a second hinge sleeve member, said second hinge sleeve member comprising an inner race member, an outer race member and a middle race member, said middle race member being comprised of a material which is relatively softer than the material comprising said inner and outer race members, said second hinge sleeve member positioned between said second pitch bearing and said pitch housing member.

15. The method of claim 14 wherein said pitch hinge bearings are self-lubricating.

* * * * *